May 3, 1966 F. R. FLUHR 3,249,748

GENERALIZED ANALOG INTEGRATOR

Filed Oct. 30, 1962 2 Sheets-Sheet 1

INVENTOR.
FREDERICK R. FLUHR
BY Eugene F. Malin, Agent
Richard C. Reed
ATTORNEY

INVENTOR.
FREDERICK R. FLUHR
BY Eugene F. Malin, Agent
Richard C. Reed
ATTORNEY

3,249,748
GENERALIZED ANALOG INTEGRATOR

Frederick R. Fluhr, 7234 E. Fort Terrace, Oxon Hill 22, Md.

Filed Oct. 30, 1962, Ser. No. 234,265
1 Claim. (Cl. 235—183)

The invention described herein may be manufactured and used by or for the Government of the United States of America for governmental purposes without the payment of any royalties thereon or therefor.

This invention relates to a device for allowing generalized integration on an analog computer and more particularly to a generalized analog integrator which does not depend upon time as the independent variable.

Heretofore electronic analog computers have been hampered by an inability to perform directly an integration with respect to a dependent variable. Electronic differential analyzers replaced mechanical differential analyzers because of their large size, slow speed of operation, and the excessive time required in programming. But the mechanical differential analyzers did not suffer from the inability to perform directly an integration with respect to more than one independent variable. Therefore, the electronic analog computer is not a general purpose differential equation solver, in contrast to the mechanical or digital differential analyzer.

It is, accordingly, an object of the present invention to provide an electronic analog computer having the ability to perform integration with respect to an arbitrary variable.

Another object is to provide an analog computer that performs integration with respect to an arbitrary variable which is relatively economical in construction and has a minimum of components.

These and other objects, advantages and novel features of the invention will be apparent from the following description and the accompanying drawings.

Analog computers of the electronic variety usually integrate with respect to time. Many instances arise when integration by more than one independent variable is desired. The basic circuit, shown in FIG. 1, operates on the transfer of charges between the two capacitors $C_1$ and $C_2$. The switch S2 is controlled by the increment ΔX. Switch S1 inserts the initial value of voltage on capacitor $C_1$ before integration starts. When the initial value is placed on $C_1$, the unity gain amplifier 5 causes the voltage across $C_2$ to become equal to that on $C_1$. When ΔX causes the switch S2 to operate, the two capacitors are connected in series with their voltages opposing and with the voltage Y applied across the series connected capacitors. Switch S2 is held in this position for a time period sufficient to allow the circuit to stabilize. The voltage across $C_1$ stabilizes at the value $$\frac{C_2}{C_1+C_2}Y$$

which is $1/2Y$ if $C_1=C_2$. The switch S2 then returns to the original position and capacitor $C_2$ is recharged to the new value of voltage across $C_1$, and the circuit is ready for the next incremental operation. The output of the first amplifier then becomes equal to the initial value of $1/2\gamma+1/2Y$. After N operations, the voltage at this point is equal to $$1/2\gamma+1/2\sum_{i=0}^{N}Yi\Delta Xi$$

The second amplifier 17 will provide the scale change giving the final output of $$Z_n=K\gamma+K\sum_{i=0}^{N}Yi\Delta Xi$$

This value of $Z_n$ approximates an integral of the equation $$Z=K\int_0^N YdX$$

The device acts as a time integrator if it is the same as an equal increment of time, $\Delta t$.

Figure 2:
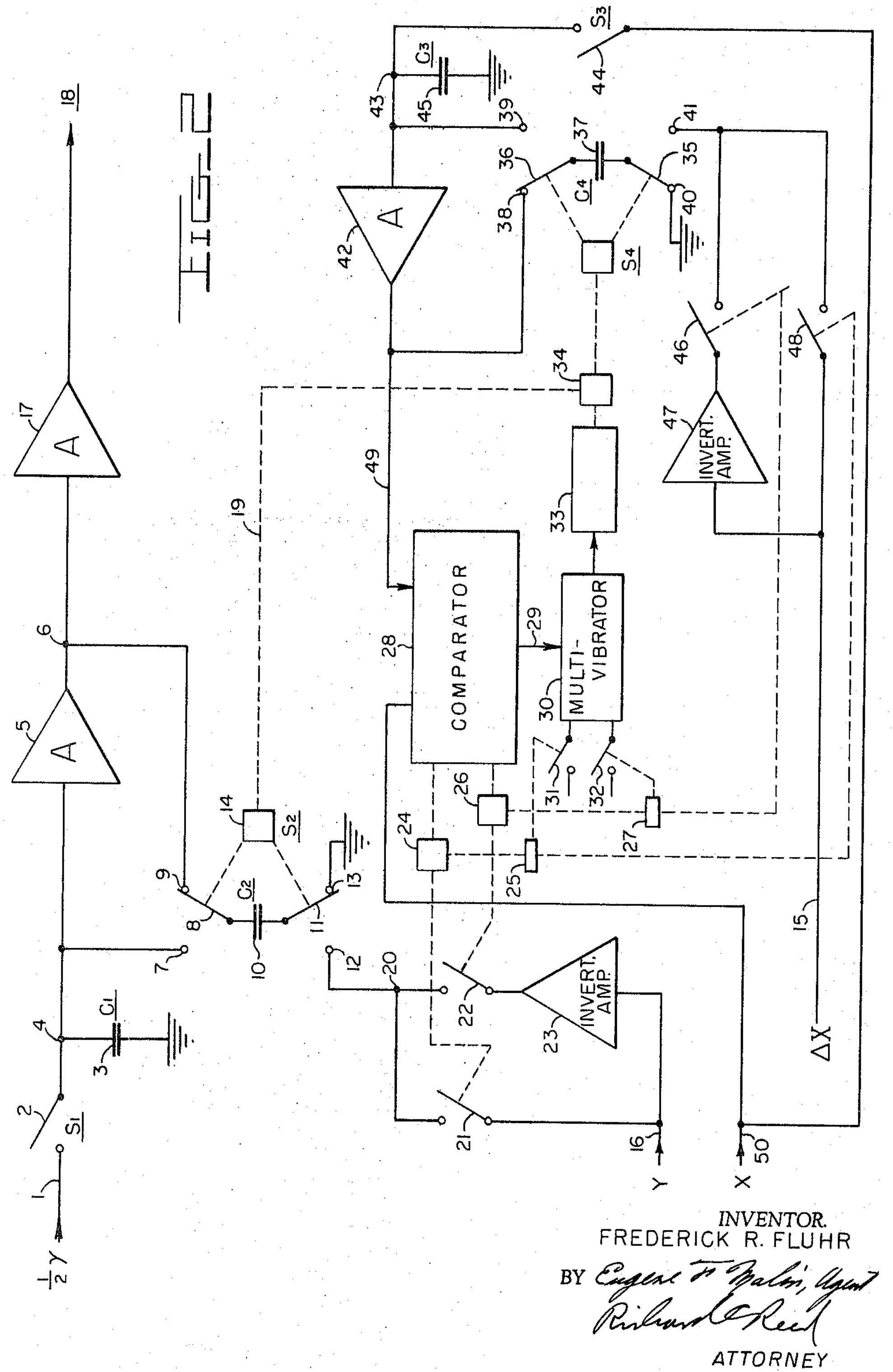
FIG. 2 is a block diagram of a generalized analog integrator.

In order to make a generalized integrator, means must be provided to make ΔX independent of time and to be capable of acting as though it could be both positive and negative. Two inegrators as described above with two inverting amplifiers, a special type of comparator and a controlled free-running multivibrator are required to implement the generalized integrator as shown in FIG. 2. Because the output of the integrator is $$Z_n=K\gamma+K\sum_{i=0}^{N}Yi\Delta Xi$$

a change of sign in ΔX would be equivalent to a change of sign of $Yi$. Thus the inverting amplifiers allow for the change of sign in the direction of integration. The magntiude of ΔX is applied to an inverting amplifier having −1 gain and to a normally open switch +ΔX. The output of the inverting amplifier is applied to the normally open switch −ΔX. When X is positive with respect to the voltage on $C_3$, the comparator will cause +ΔX to operate. If X is negative with respect to the voltage on $C_3$, the comparator will cause −ΔX to operate. If the comparator is at a null, with two voltages equal, neither switch operates. The selected input |ΔX| determines the magnitude of each incremental change of X.

When X varies more than |ΔX|, the comparator is upset and causes the proper ΔX switches to operate. The comparator also allows multivibrator 30 to run free at a rate which will allow $C_4$ and $C_2$ to properly transfer the charge held on each. Thus the $C_1$ capacitor is being charged up in a step by step fashion at the rate ΔX. When the ΔX integrator output (ΣΔXi) becomes equal to X at the input, comparator nulls and stops the multivibrator and opens the switches. The output of the ΔX integrator is $$\sum_{i=0}^{N}\Delta X$$

after N increments of X and the generalized integrator output is $$K\gamma+K\sum_{i=0}^{N}Yi\Delta Xi$$

as shown in FIG. 2. Additional outputs from the comparator and multivibrator can be provided to control other integrators of this type which can be interconnected to solve specific problems. The circuits are shown using mechanical type switching. For high speed purposes, electronic switching would be readily available.

Figure 1:
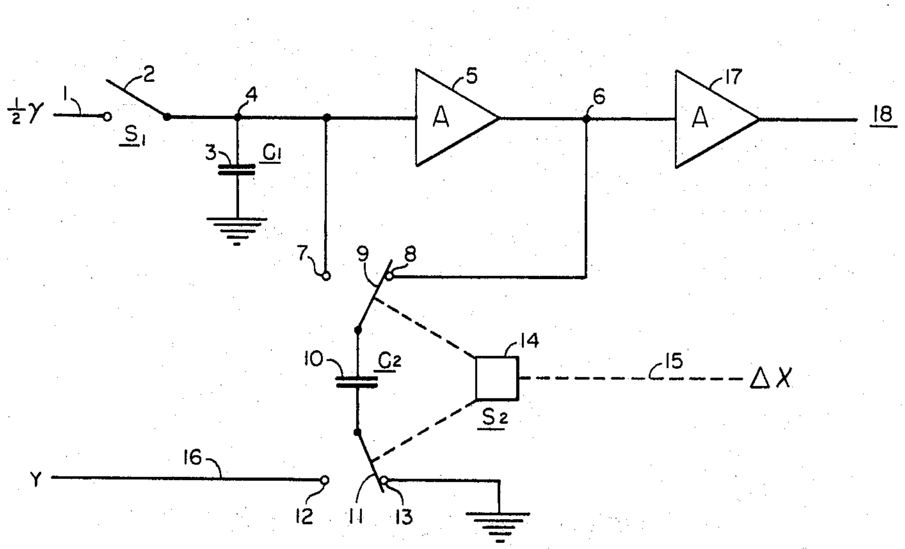
FIG. 1 is a block diagram of a basic analog computer circuit.

Referring now to the drawings, FIG. 1 shows the basic integrator circuit. The initial input is designated at 1 as $1/2\ \gamma$. Switch 2 allows this input to be impressed on capacitor 3 through terminal 4 and to amplifier 5. The output of amplifier 5 is impressed on capacitor 10 through terminals 6, 8, and 13 by means of switches 9 and 11. The switches are shown as mechanical contact types for clarification. Electronic switches would be used for high speed purposes. Capacitors 3 and 10 are connected in series by switch 9 to terminal 7 and switch 11 to terminal 12, by the mechanical switching arrangement designed as 14 and 15. The voltage Y is applied across the series connected capacitors to terminal 12 by means 16. After N operations the voltage at terminal 6 is equal to $$1/2\gamma+1/2\sum_{i=0}^{N}Yi\Delta Xi$$

Amplifier 17, having a gain equal to 2K, produces a final output $$Z_n=K\gamma+K\sum_{i=0}^{N}Yi\Delta Xi$$

The basis of the method here presented is the computer mechanization of a simple numerical integration formula. The area under a sine curve between approximate limits represents one type of a desired integral. If we divide the area into a series of vertical strips of equal width ΔX, and let the values of the coordinates at the center of each switch be represented by $Yi$ we can write $$Z=\int_{X1}^{Xn}YdX=\lim_{X\to 0}\sum_{i=1}^{N}Yi\Delta X$$

and, if ΔX is small $$Z\cong(\Delta X)\sum_{i=1}^{n}Yi$$

Thus, the evaluation requires the summation of the series of values of Y which are obtained by sampling constant intervals in the variable of integration X.

FIG. 2 shows the basic analog computer with the additional means to allow generalized integration. Capacitors 3 and 10, amplifiers 5 and 17 are similar to that shown in FIG. 1. Input X is impressed on the comparator 28 by means 50. The voltage X is compared with the voltage appearing at capacitor 45, $C_3$, through terminal 43, amplifier 42, and connection 49 to the comparator 28. The comparator will tell whether ΔX is positive, at a null, or negative, as compared with the last integrand of the total summation which appears on capacitor 45. If the comparator 28 shows that ΔX is to be positive, the comparator operates switches 21, 31, and 48 through gearboxes 24 and 25. If ΔX is less than the previous voltage, switches 22, 32, and 46 will be actuated through gearboxes 26 and 27 by the comparator. On the other hand, if a null is reached the comparator will stop the operation of the multivibrator 30 by means 29.

Therefore the comparator will perform three operations; first, it will place a plus or minus Y voltage at terminal 12 by means of switch 21 or amplifier 23 and switch 22 through terminal 20, for generalized integration. Secondly, it will place a minus ΔX or plus ΔX voltage at terminal 41 by means of switch 48 or amplifier 47 and switch 46, for transfer to capacitor 37 in order that capacitor 45 will have the proper voltage for comparison with the next integrand operation. The comparator 28 will continue in operation as set forth above as long as the difference in voltage between capacitor 45 and the impressed voltage X is greater than |ΔX|. Third, when a null is reached the comparator will discontinue the free-running multivibrator 30 operation which will allow switch S2 and S4 to be operated for calculation purposes. Multivibrator 30 acts through switch control 33 to gearbox 34 to operate switch S4 and through mechanical linkage 19 to operate switch S2. Means for additional outputs are shown at 31 and 32.

Figure 3:
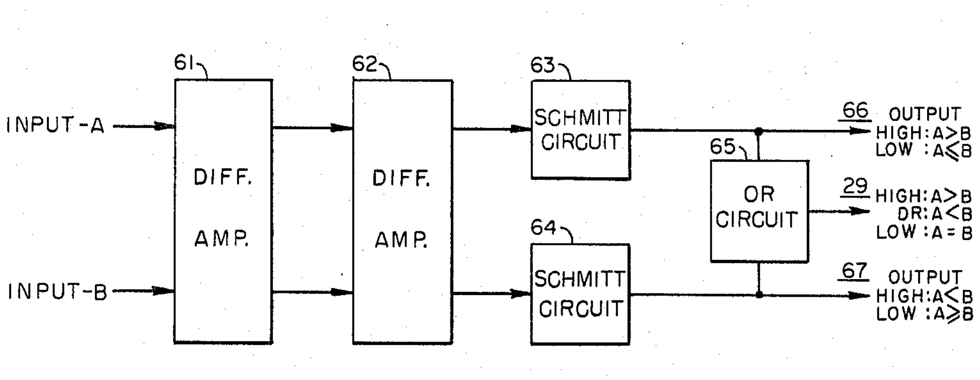
FIG. 3 is a block diagram of the two way comparator with a null sense.

The two way comparator with a null sense is shown in FIG. 3. The two inputs into the comparator 28 are designated INPUT A and INPUT B. Two difference amplifiers 61 and 62 are shown for increasing the sensitivity and reducing the common mode effects. Schmitt triggering circuits 63 and 64 are utilized in this comparator. The output of the OR circuit 65 operates the multivibrator through means 29. The output sense may be reversed if desired. The switch controls 66 and 67 operate switches 21, 31, 48, and switches 22, 32, 46, respectively, polarity sense must be maintained.

It is apparent that various changes could be made in the apparatus without departing from the invention as claimed.

The present invention is not restricted to the circuit arrangements shown by way of example in the accompanying drawings. Obviously many other modifications and variations of the present invention are possible within the scope of my invention. It is therefore to be understood that within the scope of the appended claim, the invention may be practiced otherwise than as specifically described.

What is claimed is:

An integrator comprising:
- first input means for receiving an initial value signal,
- a first capacitor for storing said initial value signal,
- first switch means coupling said first input means to said first capacitor,
- second input means for receiving a variable signal,
- first controllable inverting means coupled to said second input means for selectively inverting the polarity of a variable signal applied to said first input means,
- a first amplifier having an input coupled to said first capacitor and an output, wherein said first amplifier output is the integrator output,
- a second capacitor,
- second switch means for interconnecting said second capacitor between said first controllable inverting means and said amplifier input, or between the output of said amplifier and ground,
- third input means for receiving an incremental change,
- second controllable inverting means coupled to said third input means for selectively inverting the polarity of an incremental change applied to said third input means,
- fourth input means for receiving a variable signal,
- a third capacitor,
- a second amplifier having an input and an output with said input coupled to said third capacitor,
- third switch means coupled between said fourth input means and said input of said second amplifier,
- a fourth capacitor,
- fourth switch means for selectively coupling said fourth capacitor between said second controllable inverting means and said input of said second amplifier, or between said output of said second amplifier and ground,
- comparator means for controlling said second and fourth switch means and said second and fourth controllable inverting means, said comparator having one input coupled to said fourth input means and another input coupled to the output of said second amplifier.

References Cited by the Examiner

UNITED STATES PATENTS

| | | | |
|---|---|---|---|
| 2,789,761 | 4/1957 | Merrill et al. | 235—193 |
| 2,792,988 | 5/1957 | Goldberg | 235—183 |
| 3,048,336 | 8/1962 | Ritzenthaler | 235—183 |
| 3,138,705 | 6/1964 | Ross | 235—183 X |

MALCOLM A. MORRISON, *Primary Examiner.*

I. KESCHNER, *Assistant Examiner.*